(12) United States Patent
Saeki et al.

(10) Patent No.: US 7,661,494 B2
(45) Date of Patent: Feb. 16, 2010

(54) POWER SUPPLY SYSTEM OF FUEL CELL VEHICLE

(75) Inventors: Hibiki Saeki, Utsunomiya (JP); Satoshi Aoyagi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 11/807,005

(22) Filed: May 25, 2007

(65) Prior Publication Data
US 2007/0275276 A1 Nov. 29, 2007

(30) Foreign Application Priority Data
May 26, 2006 (JP) ............................... 2006-146882

(51) Int. Cl.
*B60K 1/00* (2006.01)
(52) U.S. Cl. .................................................. 180/65.1
(58) Field of Classification Search ................... 363/65;
180/54.1, 65.1–65.31
See application file for complete search history.

(56) References Cited

U.S. PATENT DOCUMENTS

| | | | |
|---|---|---|---|
| 6,847,127 B1 * | 1/2005 | Lee | 290/40 C |
| 6,973,393 B2 * | 12/2005 | Hasuka et al. | 702/63 |
| 7,083,017 B2 * | 8/2006 | Hasuka et al. | 180/65.1 |
| 2006/0055349 A1 | 3/2006 | Nakayama et al. | |

FOREIGN PATENT DOCUMENTS

| | | |
|---|---|---|
| JP | 2002-110210 | 4/2002 |
| JP | 2003-163013 | 6/2003 |
| JP | 2003-208913 | 7/2003 |
| JP | 2004-266951 | 9/2004 |
| JP | 2005-108573 | 4/2005 |
| JP | 2005-269823 | 9/2005 |
| JP | 2005-312279 | 11/2005 |
| JP | 2005-348530 | 12/2005 |
| JP | 2006-42548 | 2/2006 |
| JP | 2006-345651 | 12/2006 |
| WO | WO-2004/114511 | 12/2004 |

OTHER PUBLICATIONS

Japanese Office Action for Application No. 2006-146882, dated Apr. 22, 2008.
Japanese Decision to Grant a Patent for Application No. 2006-146882, dated Jul. 15, 2008.

* cited by examiner

*Primary Examiner*—Matthew V Nguyen
(74) *Attorney, Agent, or Firm*—Lahive & Cockfield, LLP; Anthony A. Laurentano

(57) ABSTRACT

This power supply system of a fuel cell vehicle is provided with a load, a fuel cell, a power storage device, a first DC-DC converter, a second DC-DC converter, a current-measuring device, a voltage-measuring device, and a controller. The controller performs a feedback control of the first DC-DC converter such that input current or output current measured by the current-measuring device becomes a target current, and also performs a feedback control of the second DC-DC converter such that input voltage or output voltage measured by the voltage-measuring device becomes a target voltage.

4 Claims, 3 Drawing Sheets

POWER SUPPLY SYSTEM OF FUEL CELL VEHICLE

BACKGROUND OF THE INVENTION

Priority is claimed on Japanese Patent Application No. 2006-146882, filed May 26, 2006, the contents of which are incorporated herein by reference.

1. Field of the Invention

The present invention relate to a power supply system of a fuel cell vehicle.

2. Description of the Related Art

A conventional power supply system of a fuel cell vehicle is known which increases the output voltage of a fuel cell using a first DC-DC converter and input it to a load, wherein if the output electrical power from the fuel cell is insufficient for the requirement by the load, then the deficiency is compensated by inputting additional electrical power to the load from a power storage device via a second DC-DC converter, while if the output electrical power from the fuel cell is excessive for the requirement by the load, then the excessive electrical power is supplied from the fuel cell to the power storage device via the first DC-DC converter and the second DC-DC converter, to charge the power storage device (for example, refer to Japanese Unexamined Patent Application, First Publication No. 2003-208913).

The power supply system of a fuel cell vehicle having the above-mentioned construction needs cooperative operations of the two DC-DC converters to supply stable current and voltage to the load; and it has been an object to establish a control method therefore.

The present invention was made in view of the above-mentioned circumstances and has an object of providing a power supply system of a fuel cell vehicle which enables a cooperative control of two DC-DC converters to supply stable current and voltage to a load.

SUMMARY OF THE INVENTION

A power supply system of a fuel cell vehicle of the present invention employed the followings in order to achieve the above object.

That is, a power supply system of a fuel cell vehicle of the present invention includes: a load mounted on a vehicle; a fuel cell and a power storage device which are connected to the load so as to be parallel with each other; a first DC-DC converter provided between the fuel cell and the load; a second DC-DC converter provided between the power storage device and the load; a current-measuring device which measures one of an input current and an output current of the first DC-DC converter; a voltage-measuring device which measures one of an input voltage and an output voltage of the second DC-DC converter; and a controller which performs a feedback control of the first DC-DC converter such that the input current or the output current measured by the current-measuring device becomes a target current, and also performs a feedback control of the second DC-DC converter such that the input voltage or the output voltage measured by the voltage-measuring device becomes a target voltage.

According to the power supply system of a fuel cell vehicle, the first DC-DC converter is controlled by controlling current, while the second DC-DC converter is controlled by controlling the voltage. Since control parameters between the first DC-DC converter and the second DC-DC converter differ from each other, controlling of the first DC-DC converter and controlling of the second DC-DC converter will not interfere with each other. Accordingly, the output current of the fuel cell can be controlled so as to be stable, while enabling controlling the input voltage to the load so as to be stable.

It may be arranged such that: the load be a motor for traveling the vehicle; and the controller increase the target voltage of the second DC-DC converter in response to an increasing target output power of the motor.

In this case, the output power control of the motor for traveling the vehicle can be performed stably, and thereby enabling securing desired motor output power reliably.

The controller may be provided with: a motor target output power calculation device which calculates the target output power of the motor; a load target voltage calculation device which calculates a target voltage of the motor in response to the target output power of the motor; a fuel cell target current calculation device which calculates a target output current of the fuel cell; a first DC-DC converter controller which performs a feedback control of the first DC-DC converter referring to the target output current of the fuel cell calculated by the fuel cell target current calculation device, as the target current of the first DC-DC converter; and a second DC-DC converter controller which performs a feedback control of the second DC-DC converter employing the target voltage of the motor calculated by the load target voltage calculation device as the target voltage of the second DC-DC converter.

In this case, the voltage to the motor can be stably controlled in response to the motor output power, while the current of the fuel cell can be stably controlled so as to be the desired current.

It may be arranged such that: the controller include an output power distribution device which distributes the target output power of the motor into an output electrical power to be generated by the fuel cell and another output electrical power to be generated by the power storage device; and the fuel cell target current calculation device calculate the target output current of the fuel cell based on the output electrical power to be generated by the fuel cell, which is distributed by the output power distribution device.

In this case, the output current of the fuel cell can be controlled in response to the distributed electrical power.

DETAILED DESCRIPTION OF THE INVENTION

A power supply system of a fuel cell vehicle according to one embodiment of the present invention will be explained below with reference to FIGS. 1 to 3.

Figure 1:
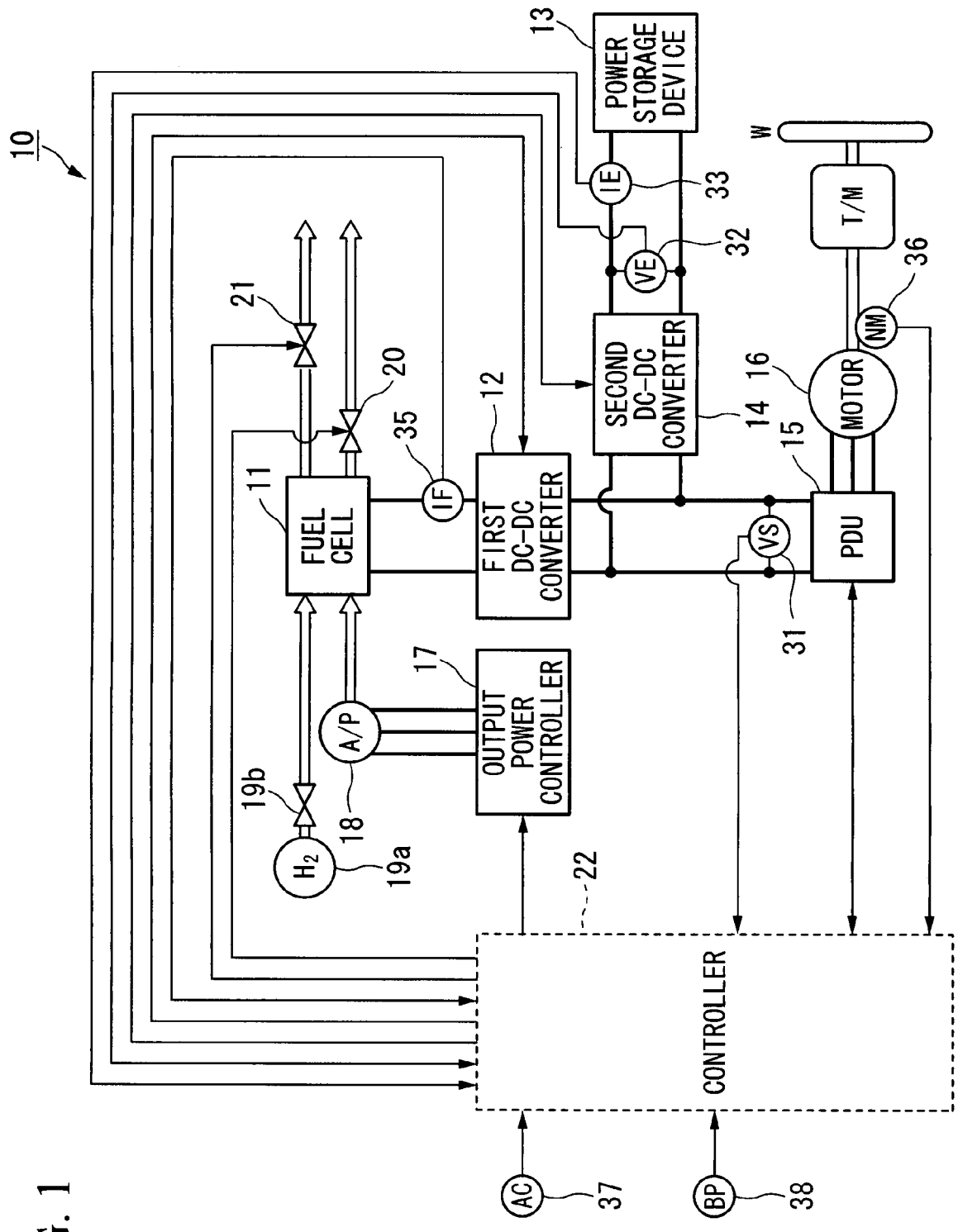
FIG. 1 shows a general construction view of one embodiment of a power supply system of a fuel cell vehicle of the present invention.

As shown in FIG. 1 for example, a fuel cell vehicle 10 of the present invention is provided with a fuel cell 11, a first DC-DC converter 12, a power storage device 13, a second DC-DC converter 14, a PDU (a Power Drive Unit) 15, a motor (a load) 16 mounted thereon for traveling the fuel cell vehicle 10, an output power controller 17, an air-supply device (A/P) 18, a hydrogen tank 19a and a hydrogen supply valve 19b, a back-pressure valve 20, a purging valve 21, a controller 22, a system voltage sensor (a voltage-measuring device) 31, a first voltage sensor 32, a first current sensor 33, a second current sensor (a current-measuring device) 35, a motor rotational speed sensor 36, an accelerator-opening degree sensor 37, and a brake pedal sensor 38.

The fuel cell 11 and the power storage device 13 are connected with the motor 16 via the PDU 15 in a parallel manner, and thereby forming a power source for the motor 16.

The motor 16 is formed, for example, by a permanent magnet type three-phase alternating current synchronous motor that uses permanent magnets for the magnetic field, and is controlled so as to be driven by three-phase alternating current power supplied from the PDU 15. While the fuel cell vehicle 10 is in deceleration, if driving power is transmitted from the driving wheels W to the motor 16, the motor 16 also works as a generator, and produces so-called regenerative braking force to recover the kinetic energy of the fuel cell vehicle 10 as an electric energy.

It is well known that the motor 16 has a characteristic in which small motor output power can be generated by low voltage, while generating large motor output power requires large voltage. On the other hand, the fuel cell 11 has a characteristic (I-V characteristic) in which increasing output electrical power (current) results in decreasing voltage. Therefore, in order to obtain a large output power of the motor 16 with electrical power supplied from the fuel cell 11, the output voltage form the fuel cell 11 needs to be increased before supplying it to the motor 16 (refer to FIG. 3). Due to this reason, the first DC-DC converter 12 is arranged between the fuel cell 11 and the PDU 15.

In addition, the second DC-DC converter 14 is arranged between the power storage device 13 and the PDU 15.

The fuel cell 11 includes a plurality of layers of fuel cells, each fuel cell being an electrolytic electrode structure formed from a solid high-polymer electrolytic membrane formed from a cation-exchanging membrane and the like, sandwiched between a fuel electrode (an anode) formed from an anode catalyst and a gas-diffusion layer and an oxygen electrode (a cathode) formed from a cathode catalyst and a gas-diffusion layer, wherein the electrolytic electrode structure is further sandwiched between a pair separators. And these stacked fuel cells are sandwiched between a pair of end plates from both sides in the stacking direction thereof.

Air being an oxidant gas (reaction gas) including oxygen is supplied from the air-supply device (A/P) 18 to the cathode of the fuel cell 11, while fuel gas (reaction gas) including hydrogen is supplied from, for example, the highly pressurized hydrogen tank 19a via the hydrogen-supply valve 19b to the anode of the fuel cell 11.

Then, hydrogen ionized by catalytic reactions on the anode catalyst of the anode migrates to the cathode via the suitably humidified solid high-polymer electrolytic membrane. In addition, electrons generated accompanied by this migration are extracted to an external circuit and used as direct current electrical energy. At the cathode at this time, hydrogen ions, electrons, and oxygen react and produce water.

Moreover, the hydrogen-supply valve 19b is for example a pneumatic type of proportional pressure control valve which takes the pressure of air supplied from the air-supply device 18 as a signal pressure, and controls the pressure at the point of exit from the hydrogen-supply valve 19b of the hydrogen gas passing through the hydrogen-supply valve 19b so as to be within a predetermined range that corresponds to the signal pressure.

In addition, the air-supply device 18 having an air compressor and the like takes air from, for example, the outside of the fuel cell vehicle 10, compresses, and supplies the air as reaction gas to the cathode of the fuel cell 11. In addition, the rotational speed of the motor (not illustrated) which drives the air-supply device 18 is controlled by the output power controller 17 having, for example, a PWM inverter that operates in a pulse width modulation mode (PWM), based on control instruction sent from the controller 22. Moreover, the electrical power to the motor of the air-supply device 18 may be supplied from any one of the fuel cell 11 and the power storage device 13, or may be supplied from both of them.

Then, the unreacted discharged gas discharged from the hydrogen discharging outlet of the fuel cell 11 is introduced into a dilution box (not illustrated) via a discharging control valve (not illustrated) which is openably and closeably controlled by the controller 22, and is discharged to the outside (atmosphere or the like) via the purging valve 21 after the hydrogen concentration thereof is reduced in the dilution box to a predetermined concentration.

Moreover, a part of the unreacted discharged gas discharged from the hydrogen discharging outlet of the fuel cell 11 is introduced into a circulation path (not illustrated) having, for example, a circulation pump (not illustrated), an ejector (not illustrated), and the like. Hydrogen supplied from the hydrogen tank 19a and the discharged gas discharged from the fuel cell 11 are mixed, and are again supplied to the fuel cell 11.

Then, the unreacted discharged gas discharged from an air-discharging outlet of the fuel cell 11 is discharged to the outside (atmosphere or the like) via the backpressure valve 20 of which a valve opening degree is controlled by the controller 22.

The first DC-DC converter 12 is formed so as to include, for example, a chopper-type power conversion circuit which can increase the output voltage of the fuel cell 11. The first DC-DC converter 12 controls the output current IF output from the fuel cell 11, by chopping operations for intermitting the voltage applied to the load and the current supplied to the load, that is, by ON and OFF operations (switching operations) of a switching element provided in the chopper-type power conversion circuit. Thus, the measurement signal output from the second current sensor 35 which measures the output current IF from the fuel cell 11 is input to the controller 22. The switching operations are controlled in accordance with a duty of a control pulse input from the controller 22 (i.e., the ratio of ON and OFF operations).

For example, the first DC-DC converter 12 increases the output voltage of the fuel cell 11 in accordance with the driving status of the fuel cell vehicle 10. In this case, the duty of the control pulse is set to the suitable value within a range between 0% and 100%, the output current IF of the fuel cell 11 being a primary current is suitably limited in accordance with the duty of the control pulse, and the limited current is output as a secondary current.

Furthermore, the first DC-DC converter 12 sets a direct connection between the fuel cell 11 and the PDU 15, in accordance with the driving state of the fuel cell vehicle 10. In this case, if the duty of the control pulse is set to 100% and if the switching element is fixed to ON-state, then the output voltage of the fuel cell 11 and the system voltage VS which is an input voltage of the PDU 15 become the equivalent values with each other.

The power storage device 13 is a capacitor or a battery or the like formed from, for example, an electric double layer condenser, an electrolytic condenser, or the like.

The second DC-DC converter 14 is formed so as to include, for example, an interactive chopper-type power conversion circuit which can increase the terminal voltage VE and can decrease the system voltage VS of the of the power storage device 13. The second DC-DC converter 14 can increase the terminal voltage VE of the power storage device 13 and can apply it to the PDU 15. Furthermore, the second DC-DC converter 14 can decrease the system voltage VS which relates to generation of the fuel cell 11 or the regenerating operations of the motor 16 to charge the power storage device 13. The second DC-DC converter 14 controls the system voltage VS being input voltage to the PDU 15 (in other words, applied voltage to the motor 16), by chopping operations for intermitting the voltage applied to the load and the current supplied to the load, that is, by ON and OFF operations (switching operations) of a switching element provided in the chopper-type power conversion circuit. Therefore, the detection signals output from the system voltage sensor 31 which measures the system voltage VS is input to the controller 22. The switching operations of the switching element are controlled in accordance with a duty of a control pulse input from the controller 22 (i.e., the ratio of ON and OFF operations).

In addition, the second DC-DC converter 14 prohibits extraction of the of the output current IE from the power storage device 13 in accordance with the driving state of the fuel cell vehicle 10. In this case, when, for example, the duty of the control pulse input from the controller 22 to the second DC-DC converter 14 is set to 0%, then the switching element provided in the second DC-DC converter 14 is fixed to OFF-state, and the power storage device 13 and the PDU 15 are thereby electrically disconnected. In addition, when, for example, the duty of the control pulse is set to a suitable value within a range between 0% and 100%, ON and OFF operations of the switching element provided in the second DC-DC converter 14 are controlled such that the output power of the second DC-DC converter 14 becomes zero.

The PDU 15 is provided with, for example, a PWM inverter that operates in a pulse width modulation mode (PWM), and controls the driving and the regenerating operation of the motor 16 based on control instruction sent from the controller 22. This PWM inverter is provided with a bridge circuit which is formed by connecting a plurality of, for example, transistor switching elements so as to form a bridge. While, for example, driving the motor 16, the PWM inverter transforms the direct current powers output from the first DC-DC converter 12 and the second DC-DC converter 14 to three-phase alternating current power based on the pulse width modulation signal input from the controller 22, and then supplies it to the motor 16. On the other hand, while the motor 16 is in a regenerating operation, the three-phase alternating current power output from the motor 16 is converted to the direct current power, and the direct current power is supplied to the power storage device 13 via the second DC-DC converter 14 to charge the power storage device 13.

The controller 22 controls the power-generating state of the fuel cell 11 by outputting instructions for the pressure and the flow rate of the reaction gas supplied from the air-supply device 18 to the fuel cell 11, and an instruction for valve opening degree of the backpressure valve 20 based on, for example, the driving state of the fuel cell vehicle 10, the concentration of the hydrogen contained in the reaction gas supplied to the anode of the fuel cell 11, the concentration of the hydrogen contained in the discharged gas discharged from the anode of the fuel cell 11, and the power generating state of the fuel cell 11 (for example, the voltage between terminals of the plurality of fuel cells, the output voltage VF of the fuel cell 11, the output current IF output from the fuel cell 11, and the internal temperature of the fuel cell 11).

Furthermore, the controller 22 controls an electrical power converting operation of the PWM inverter provided in the PDU 15. While driving the motor 16 for example, the controller 22 calculates a torque instruction which is an instruction value for the torque output from the motor 16, based on the measurement signal output from the accelerator-opening degree sensor 37 which measures an accelerator opening degree AC that corresponds to the accelerator-driving operation amount by the driver, the measurement signal output from the brake pedal sensor 38 which detects whether the driver operates the brake pedal BP or not, and the measurement signal output from the motor rotational speed sensor 36, with reference to, for example, a torque instruction map or the like which was set in advance so as to indicate the predetermined relationship of the accelerator opening degree AC, the rotational speed NM, and the torque instruction. Then, the controller 22 calculates the target motor output power which is necessary for making the motor 16 output the torque that corresponds to the torque instruction. Then, in accordance with the target motor output power, the controller 22 sets the switching instruction (i.e., the pulse width modulation signal) formed from pulses for driving ON and OFF of the switching element of the PWM inverter, by the pulse width modulation (PWM).

When the switching instruction is input from the controller 22 to the PDU 15, the current sequentially flows through stator loop windings (not illustrated) of each phases of the motor 16. With this, the magnitude of the applied voltage (i.e., amplitude) and phases in U-phase, V-phase, and W-phase are controlled. Then, phase currents for U-phase, V-phase, and W-phase, which correspond to the torque instruction will be supplied to each phases of the motor 16.

The controller 22 is input with: the measurement signal output from the accelerator-opening degree sensor 37; the detection signal output from the brake pedal sensor 38; and the measurement signal output from the motor rotational speed sensor 36.

Figure 2:
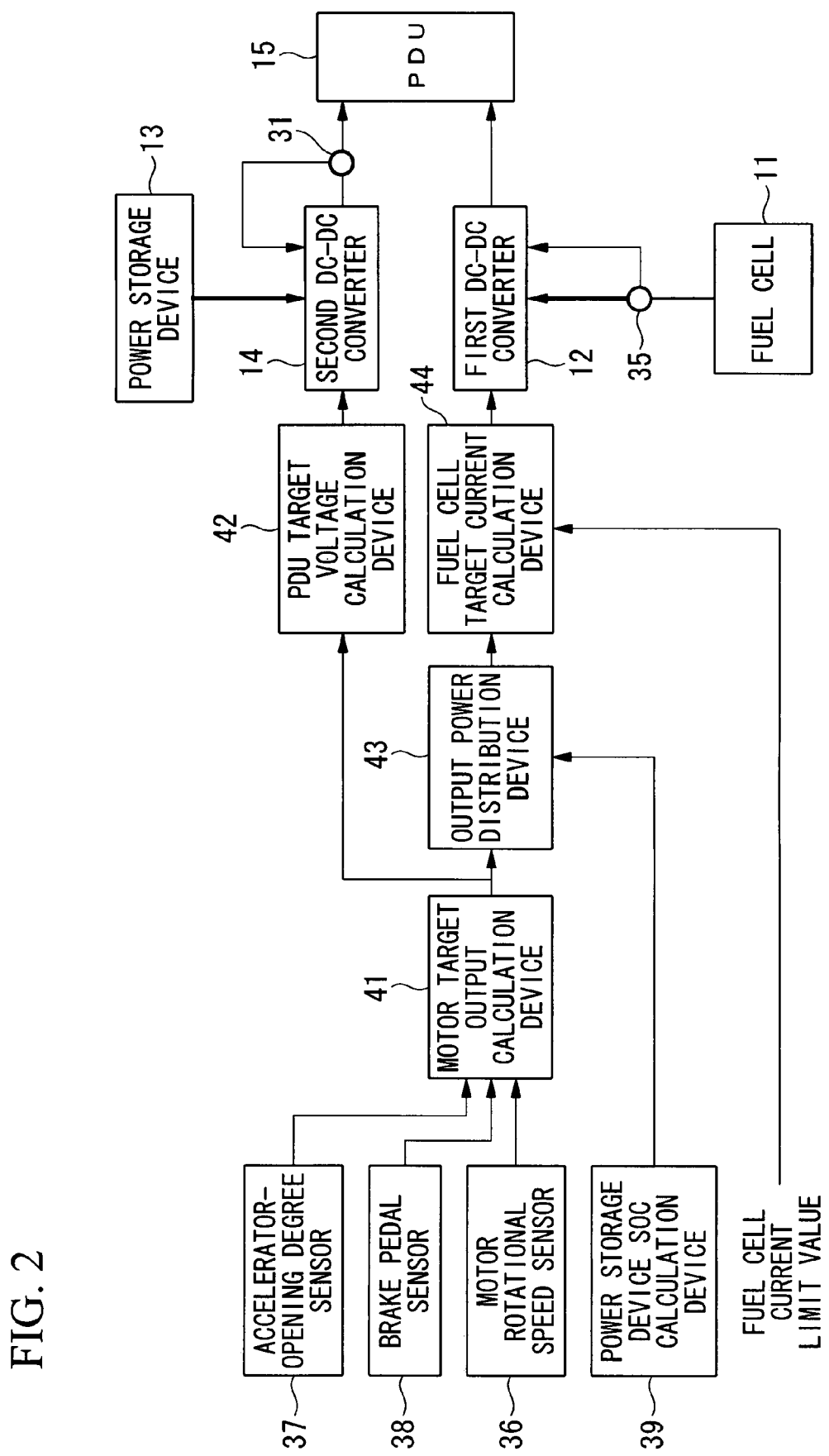
FIG. 2 shows a control block diagram of the same power supply system.

In addition, the controller 22 is provided with a power storage device SOC calculation device 39 which calculates the remaining capacity SOC of the power storage device 13 (refer to FIG. 2). The controller 22 calculates the remaining capacity SOC of the power storage device 13 by, for example, calculating an integrating charging amount and an integrating discharging amount by integrating the charging current and the discharging current of the power storage device 13 for each predetermined time interval, and by adding these integrating charging amount and integrating discharging amount to a remaining capacity at the initial state or the before of starting charging and discharging, or subtracting these integrating charging amount and integrating discharging amount from the remaining capacity at the initial state or the before of starting charging and discharging.

The controller 22 is input with measurement signals output from the first voltage sensor 32 which measures the terminal voltage VE of the power storage device 13, and the first current sensor 33 which measures the charging current and the discharging current of the power storage device 13.

Then, the controller 22 outputs a control pulse for controlling the electrical power converting operations of the first DC-DC converter 12 in accordance with the target motor output power and the remaining capacity SOC of the power storage device 13, controls the output current IF output from the fuel cell 11, outputs the control pulse for controlling the electrical power converting operations of the second DC-DC converter 14, and thereby controls charging and discharging of the power storage device 13.

In this fuel cell vehicle 10, if a predetermined condition is satisfied while driving the motor 16, then power-assisting (assist) is executed by the power storage device 13 to supply electrical power from both of the fuel cell 11 and the power storage device 13 to the motor 16. At this time, it is necessary to increase the output electrical power of the fuel cell 11 by the first DC-DC converter 12, and to increase the output electrical power of the power storage device 13 by the second DC-DC converter 14. Accordingly, the controller 22 needs to control the first DC-DC converter 12 and the second DC-DC converter 14 at the same time.

In this case, one may employ a control method including: a feedback control in which an output electrical power of the first DC-DC converter 12 is measured, and the measured output voltage is controlled so as to be the target input voltage to the PDU 15; and another feedback control in which an output electrical power of the second DC-DC converter 14 is measured, and the measured output voltage is controlled so as to be the target input voltage to the PDU 15. However, such control method will cause unstable voltages due to interference between the voltage controls of the first DC-DC converter 12 and the second DC-DC converter 14, and thereby causing difficulties in controlling the output voltage of the fuel cell 11 and in controlling the input voltage to the PDU 15.

Therefore, in the power supply system of a fuel cell vehicle of the present embodiment, the first DC-DC converter 12 performs a feedback control based on current, while the second DC-DC converter 14 performs another feedback control based on voltage, and thereby preventing the interference of the controls therebetween.

The detailed explanation will be made hereinbelow with reference to a block diagram shown in FIG. 2.

Firstly, the motor target output power calculation device 41 calculates the torque instruction which is an instruction value for the torque output from the motor 16, based on: the measurement signal output from the accelerator-opening degree sensor 37, which corresponds to the accelerator-opening degree; the detection signal output from the brake pedal sensor 38; and the measurement signal that corresponds to the motor rotational speed and is output from motor rotational speed sensor 36, with reference to the torque instruction map or the like which was set in advance so as to indicate the predetermined relationship of the accelerator opening degree AC, the rotational speed NM, and the torque instruction. As a result, the motor target output power calculation device 41 calculates the motor target output power which is necessary for the motor 16 to output the torque corresponding to the torque instruction.

Controls of the second DC-DC converter 14 will be explained below.

Figure 3:
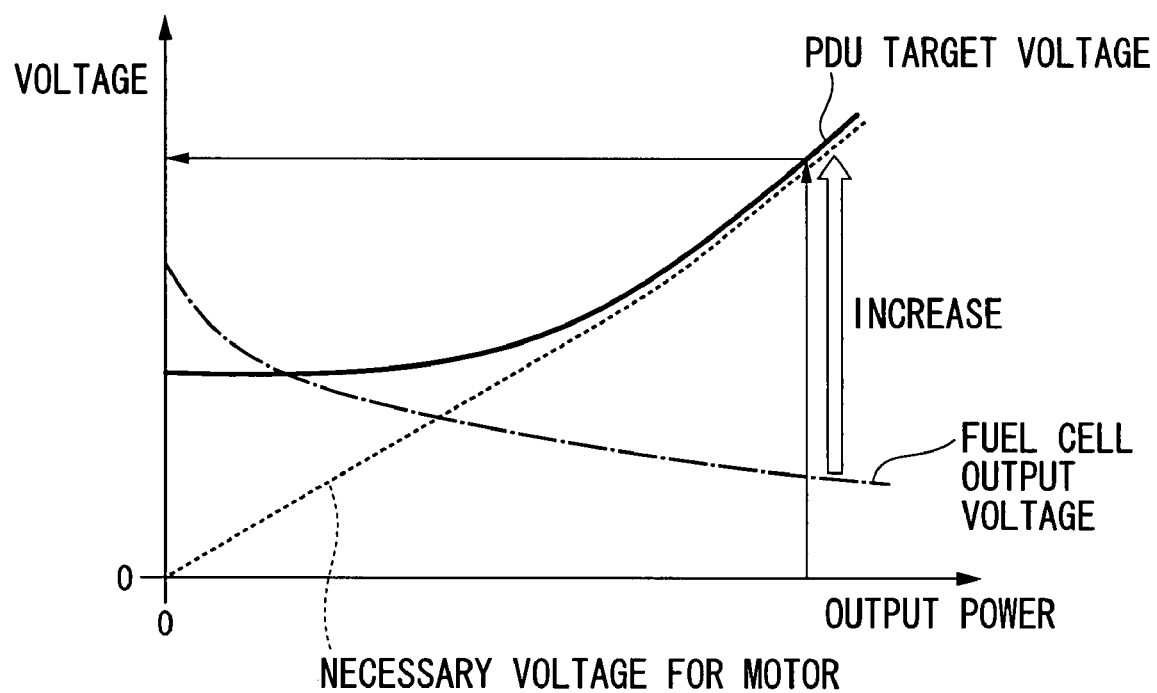
FIG. 3 shows one example of a PDU target voltage table utilized in the embodiment.

The PDU target voltage calculation device (a load target voltage calculation device) 42 calculates the target voltage to the PDU 15 that corresponds to the motor target output power calculated by the motor target output power calculation device 41 (that is, the target voltage to the motor 16), with reference to the PDU target voltage table shown in FIG. 3. In the PDU target voltage table shown in FIG. 3, the target voltage to the PDU 15 is set so as to increase in response to the increasing motor target output power, in accordance with the output characteristics of the motor 16.

The controller 22 performs a feedback control of the second DC-DC converter 14 such that the system voltage VS measured by the system voltage sensor 31 agrees with the target voltage of the PDU 15 calculated by the PDU target voltage calculation device 42.

Next, controls of the first DC-DC converter 12 will be explained below.

The output power distribution device 43 determines the most suitable power distribution between the output electrical power by the fuel cell 11 and the output electrical power by the power storage device 13, for supporting the motor target output power calculated by the motor target output power calculation device 41, considering the remaining amount SOC of the power storage device 13 calculated by the power storage device SOC calculation device 39. That is, the output power distribution device 43 determines the distribution of the output electrical power of the fuel cell 11 and the output electrical power of the power storage device 13.

In addition, the fuel cell target current calculation device 44 calculates the target current output from the fuel cell 11 (in other words, the target current input to the first DC-DC converter 12) based on the output power of the fuel cell 11 determined by the output power distribution device 43, considering the current limitation value which is an input signal from a fuel cell controller (not illustrated) and is extractable from the fuel cell 11.

Then, the controller 22 performs a feedback control of the first DC-DC converter 12 such that the output current IF of the fuel cell 11 measured by the second current sensor 35 meets the target current calculated by the fuel cell target current calculation device 44.

As has been explained in the above, the first DC-DC converter 12 connected to the fuel cell 11 performs the feedback control of the current so as to be the target current, while the second DC-DC converter 14 connected to the power storage device 13 performs another feedback control of the voltage so as to be the target voltage; therefore, since the first DC-DC converter 12 and the second DC-DC converter 14 control different parameters with each other, the controls therebetween will not interfere with each other.

Accordingly, the output current of the fuel cell 11 can be controlled stably and the input voltage to the PDU 15 can be controlled stably.

In addition, since the target voltage to the PDU 15 set in the PDU target voltage calculation device 42 is increased in accordance with increasing motor target output power, the desired motor output can be secured reliably.

As a result, it is possible to perform the output control of the motor 16 being the driving motor of the fuel cell vehicle 10.

Moreover, the present invention is not limited only to the above-mentioned embodiment.

For example, in the above-mentioned embodiment, the control parameter that should be controlled by the first DC-DC converter 12 is set to be the output current of the fuel cell 11 (in other words, the input current of the first DC-DC converter 12); however, the output current of the first DC-DC converter 12 may be the control parameter thereinstead. In addition, in the above-mentioned embodiment, the control parameter that should be controlled by the second DC-DC converter 14 is set to be the output voltage of the second DC-DC converter 14; however, the input voltage of the second DC-DC converter 14 may be the control parameter thereinstead.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A power supply system of a fuel cell vehicle comprising:
a load mounted on a vehicle;
a fuel cell and a power storage device which are connected to the load so as to be parallel with each other;
a first DC-DC converter provided between the fuel cell and the load;

a second DC-DC converter provided between the power storage device and the load;

a current-measuring device which measures one of an input current and an output current of the first DC-DC converter;

a voltage-measuring device which measures one of an input voltage and an output voltage of the second DC-DC converter; and a controller which performs a feedback control of the first DC-DC converter such that the input current or the output current measured by the current-measuring device becomes a target current, and also performs a feedback control of the second DC-DC converter such that the input voltage or the output voltage measured by the voltage-measuring device becomes a target voltage.

2. The power supply system of a fuel cell vehicle according to claim 1, wherein:

the load is a motor for traveling the vehicle; and the controller increases the target voltage of the second DC-DC converter in response to an increasing target output power of the motor.

3. The power supply system of a fuel cell vehicle according to claim 2, wherein the controller comprises:

a motor target output power calculation device which calculates the target output power of the motor;

a load target voltage calculation device which calculates a target voltage of the motor in response to the target output power of the motor;

a fuel cell target current calculation device which calculates a target output current of the fuel cell;

a first DC-DC converter controller which performs a feedback control of the first DC-DC converter referring to the target output current of the fuel cell calculated by the fuel cell target current calculation device, as the target current of the first DC-DC converter; and a second DC-DC converter controller which performs a feedback control of the second DC-DC converter employing the target voltage of the motor calculated by the load target voltage calculation device as the target voltage of the second DC-DC converter.

4. The power supply system of a fuel cell vehicle according to claim 3, wherein:

the controller comprises an output power distribution device which distributes the target output power of the motor into an output electrical power to be generated by the fuel cell and another output electrical power to be generated by the power storage device; and the fuel cell target current calculation device calculates the target output current of the fuel cell based on the output electrical power to be generated by the fuel cell, which is distributed by the output power distribution device.

* * * * *